3,348,884
WHEEL CLAMP
Kenneth C. Adams, Wauwatosa, Wis., assignor to Allis-Chalmers Manufacturing Company, Milwaukee, Wis.
Filed May 9, 1966, Ser. No. 548,597
5 Claims. (Cl. 301—9)

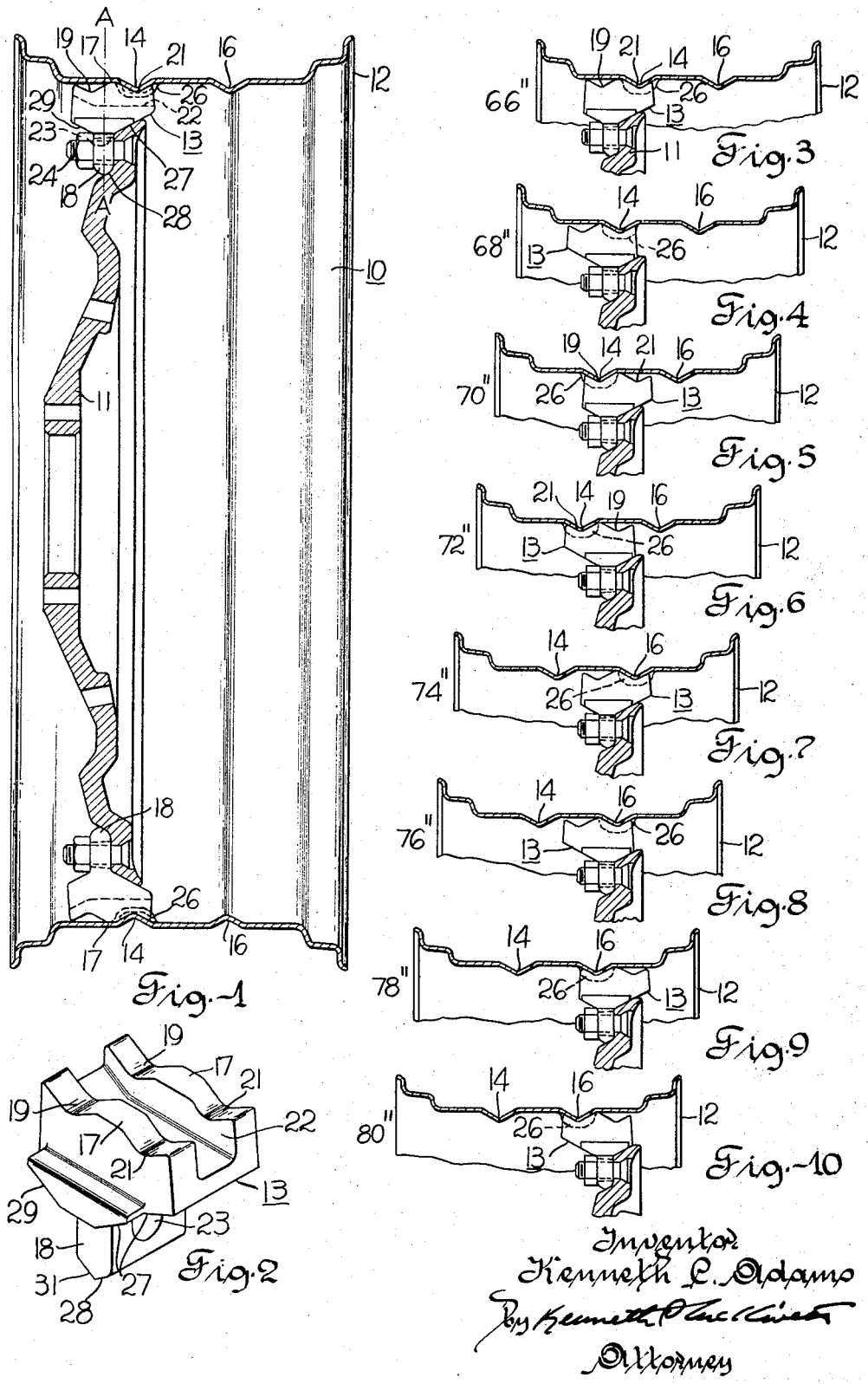

ABSTRACT OF THE DISCLOSURE

A tread width adjusting means for the rear wheels of a tractor.

This invention relates to means for adjusting rear wheels on a tractor transversely relative thereto. The types of tread adjustment for tractor rear wheels has generally fallen into three categories, one laterally adjusts the wheel on an outwardly projecting drive axle. Another uses clamps and a rim having spaced apart beads to laterally adjust the rim relative to a central casting fixed to the tractor drive axle, and the third is the power shift wheel which uses clamp and helical rails to adjust the wheel tread by means of tractor power. The present invention is primarily concerned with the second type which uses a wheel rim with two laterally spaced circular beads and clamp castings which adjustably secure the rim and tire to a wheel casting fixed to the tractor drive axle.

This invention relates to vehicle wheels of the type in which the rim is adjustable axially with respect to the hub, and has as its general object to provide such a wheel having at least eight different positions of adjustment which are all accomplished with a rim clamp which is always conveniently mounted on the outer portion of the wheel hub, and which is more simple and less expensive in construction than previously available wheels having that many positions of adjustment.

Another object of this invention is to provide a rim having peripheral ridges or grooves interiorly thereof adapted to cooperate with a clamping lug on the periphery of a wheel in such a way that by selectively arranging different grooves or notches in different grooves or notches, respectively, on the lugs surrounding the periphery of the wheel, the rim may be positioned at various positions axially of the wheel.

Other objects and advantages of the present invention will appear more fully from the following detailed description which, taken in conjunction with the accompanying drawing, will disclose to those skilled in the art the particular construction and operation of a preferred form of the present invention.

Referring to the drawing:

FIG. 1 is a vertical cross section of a wheel embodying the invention;

FIG. 2 is an isomeric view of the clamp shown in FIG. 1;

FIGS. 3 through 10 are fragmentary views similar to FIG. 1 but on a slightly reduced scale, showing the various adjusted positions of the rim to the wheel.

In the drawings the wheel 10 includes a central disc casting 11 which is mounted on a tractor wheel hub (not shown) in a conventional manner. Wheel 10 includes an outer rim 12 which is mounted on the central casting 11 for axial adjustment by means of a series of clamps 13. Rim 12 has a pair of axially spaced beads 14 and 16 which project inwardly toward the center of the wheel and extend around the entire circumference of the rim 12.

Clamp 13 is a one piece casting which consists generally of a rim engaging portion 17 and an inner attaching portion 18. The rim engaging portion 17 is provided with axially spaced V-shaped portions 19 and 21 which correspond to the shape of beads 14 and 16 on the rim 12. Rim engaging portion 17 of the clamp 13 is also divided by an axial slot 22 that separates the upper clamp portion 17 into two axially extending upstanding lugs with the rim engaging portions 19 and 21, arranged at right angles to slot 22. The inner portion 18 of clamp 13 is provided with a radially slotted opening 23 to receive a bolt assembly 24 which secures the clamp casting 13 to the central disc casting 11.

Rim 12 is provided with a series of transverse beads 26 (FIG. 3) which are adapted to be received in slots 22 to prevent relative rotational movement between clamps 13 and rim 12.

Clamps 13 (FIGS. 1 and 2) are provided with two pairs of cam surfaces, one pair being designated by reference numerals 27 and 28 and the other pair by numerals 29 and 31. The inclined cam surfaces are arranged and function in the manner described in United States Patent to Stough 2,963,317. Cam surfaces 27 and 28 contact complementary surfaces on the wheel disc 11 and when bolt 24 is tightened the engaging cam surfaces cause the clamps 13 to move outwardly and tightly engage the rim bead 14. The slotted portion 22 of the clamp 13 straddles transverse bead 26 to prevent rotation of the rim 12 relative to clamps 13.

It is to be noted that the inner attaching portion 18 of the clamp 13 is laterally offset with respect to the outer clamp portion 17 and the V-notches therein. The V-notches 19 and 21 are spaced 2 inches apart and the inner attaching portion 18 is offset 1 inch so that when clamp 13 is attached to disc 11 in reversed relation the notches 19 and 21 are laterally shifted 1 inch. This arrangement provides four mounting positions for the rim 12 with such positions spaced 1 inch apart and when combined with the two beads 14 and 16 on the rim which beads are spaced 4 inches apart the amount of adjusted positions is doubled resulting in eight 1 inch spaced positions for the rear tractor wheels to achieve wheel tread adjustment from 66 inches to 80 inches.

As an illustration as to how readily the wheels can be adjusted to desired tread width, assume that the wheels are in the adjustment shown in FIG. 3 which is a 66 inch distance between wheels. Now assume a 70 inch spacing is desired. This would be the adjustment shown in FIG. 5. To achieve this, the axle (not shown) supporting this wheel would be jacked up slightly and all clamps removed excepting the top clamp. The jack would then be lowered until bead 14 moved out of V-groove 21. Rim 12 would then be manipulated until bead 14 became aligned with V-groove 19. The axle would then be jacked up until bead 14 was received in V-groove 19 and the lower end of the wheel assembly was free of the ground. At this time the other clamps 13 would be replaced.

If the desired adjustment had been to 72 inches instead of 70 inches, it would have been necessary to remove all of the clamps and install them in reversed position as shown in FIG. 6.

From a plane including the longitudinal center line A—A of clamp 13 as shown in FIG. 1, V-groove 19 is ½ inch spaced therefrom and V-groove 21 is 1½ inches spaced therefrom in the opposite direction. Therefore a reversal of clamp 13 results in an adjustment of 1 inch and with both rear wheels of the tractor concerned being so adjusted results in a total adjustment of 2 inches.

From the foregoing it has been shown how a tread adjustment of 8 equal increments can easily be obtained by reversing clamps and without placing them on the opposite side of the wheel and without reversing the wheel.

It is to be noted that in all adjusted positions shown, clamp 13 is on the outside of the wheel in a readily accessible position.

The embodiments of the invention in which an exclusive property or privilege is claimed are defined as follows:

1. A wheel and rim assembly comprising a wheel having a portion adapted to be attached to an axle, a rim arranged peripherally of said wheel, adjustable clamps retaining said rim on said wheel, said rim being provided with a pair of axially spaced beads projecting inwardly toward the axis of rotation of said wheel, said clamps including a wheel attaching portion extending radially inward to engage said wheel and means defining a pair of axially spaced recesses with each recess of different axial spacing on opposite sides of the axial center of said attaching portion receiving one or the other of said beads in one or the other of said recesses, said clamps being reversible on one side of said wheel to provide a different spacing of said recesses relative to said wheel.

2. A wheel and rim assembly according to claim 1 and wherein one of said recesses is spaced from the axial center of said attaching portion; a distance equal to three times the spacing of the other recesses relative to the axial center of said attaching portion.

3. A wheel and rim assembly according to claim 2 and wherein said beads are spaced apart twice the distance said recesses are spaced apart to provide eight different possible settings of said rim relative to said wheel.

4. A wheel and rim assembly according to claim 3 and wherein said clamps are mounted on the outer side of said wheel for any of the possible eight positions of adjustment.

5. A wheel and rim assembly according to claim 4 and wherein said clamps are provided with peripheral slots for receiving transverse beads of said rim for preventing relative rotation between said wheel and said rim.

References Cited

UNITED STATES PATENTS 2,100,654 11/1937 Swain.
2,162,696 6/1939 Burger.
2,267,980 12/1941 Jones.

FOREIGN PATENTS 1,101,487 4/1955 France.
483,126 4/1938 Great Britain.

RICHARD J. JOHNSON, *Primary Examiner.*